(12) United States Patent
Kim

(10) Patent No.: US 11,931,724 B2
(45) Date of Patent: Mar. 19, 2024

(54) CATALYST, METHOD FOR PRODUCING SAME, ELECTRODE COMPRISING SAME, MEMBRANE-ELECTRODE ASSEMBLY COMPRISING SAME, AND FUEL CELL COMPRISING SAME

(71) Applicant: KOLON INDUSTRIES, INC., Seoul (KR)

(72) Inventor: Jung Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 376 days.

(21) Appl. No.: 17/287,493

(22) PCT Filed: Dec. 16, 2019

(86) PCT No.: PCT/KR2019/017771
§ 371 (c)(1),
(2) Date: Apr. 21, 2021

(87) PCT Pub. No.: WO2020/138800
PCT Pub. Date: Jul. 2, 2020

(65) Prior Publication Data
US 2021/0387168 A1    Dec. 16, 2021

(30) Foreign Application Priority Data
Dec. 26, 2018  (KR) .................. 10-2018-0169074

(51) Int. Cl.
*B01J 23/42*    (2006.01)
*B01J 21/18*    (2006.01)
(Continued)

(52) U.S. Cl.
CPC .............. *B01J 23/42* (2013.01); *B01J 21/185* (2013.01); *B01J 23/8913* (2013.01);
(Continued)

(58) Field of Classification Search
CPC ...... B01J 23/42; B01J 21/185; B01J 23/8913; B01J 37/0215; B01J 37/04; B01J 37/08; B01J 37/26; H01M 4/926; H01M 8/1004
(Continued)

(56) References Cited

U.S. PATENT DOCUMENTS 3,711,425 A * 1/1973 Suggitt .................... B01J 21/04
502/220
3,969,267 A * 7/1976 McVicker ................ B01J 37/26
423/489
(Continued)

FOREIGN PATENT DOCUMENTS

CN    1801514 A    7/2006
CN    106575773 A    4/2017
(Continued)

OTHER PUBLICATIONS

JP office action dated May 30, 2022.
(Continued)

*Primary Examiner* — Patricia L. Hailey
(74) *Attorney, Agent, or Firm* — Harvest IP Law, LLP

(57) ABSTRACT

Disclosed is a catalyst, a method for producing the catalyst, an electrode comprising the catalyst, a membrane-electrode assembly comprising the electrode, and a fuel cell comprising the membrane-electrode assembly, the catalyst being highly efficient and having a long service life due to improved interfacial properties with ionomer from having fluoride (F) groups on the surface thereof. The catalyst according to the present invention comprises: a support; metal particles supported in the support; and fluoride (F) groups on the surface of the support and metal particles.

10 Claims, 12 Drawing Sheets

(51) Int. Cl.
  *B01J 23/89* (2006.01)
  *B01J 37/02* (2006.01)
  *B01J 37/04* (2006.01)
  *B01J 37/08* (2006.01)
  *B01J 37/26* (2006.01)
  *H01M 4/92* (2006.01)
  *H01M 8/1004* (2016.01)

(52) U.S. Cl.
  CPC ........... *B01J 37/0215* (2013.01); *B01J 37/04* (2013.01); *B01J 37/08* (2013.01); *B01J 37/26* (2013.01); *H01M 4/926* (2013.01); *H01M 8/1004* (2013.01)

(58) Field of Classification Search
  USPC ......... 502/36, 181, 182, 185, 224, 230, 326; 429/523–527
  See application file for complete search history.

(56) References Cited

U.S. PATENT DOCUMENTS

| | | | | |
|---|---|---|---|---|
| 4,032,474 | A | * | 6/1977 | Goudriaan ............... B01J 23/84 502/223 |
| 4,598,059 | A | * | 7/1986 | Goudriaan ............... B01J 37/26 502/220 |
| 5,116,592 | A | * | 5/1992 | Weinberg ................ C01B 32/10 502/181 |
| 5,338,531 | A | * | 8/1994 | Chuang ................... B01J 21/18 502/181 |
| 5,523,501 | A | * | 6/1996 | Kellner ................... C07C 17/23 570/176 |
| 5,981,813 | A | | 11/1999 | Cuzzato |
| 6,074,985 | A | * | 6/2000 | Elsheikh ................. B01J 27/12 502/181 |
| 6,423,664 | B1 | * | 7/2002 | Marchal-George .... B01J 27/128 585/277 |
| 2009/0011320 | A1 | * | 1/2009 | Senda ................. H01M 4/8605 502/224 |
| 2009/0136810 | A1 | | 5/2009 | Ishida |
| 2011/0136046 | A1 | | 6/2011 | Merzougui |
| 2013/0309165 | A1 | | 11/2013 | Koo |
| 2014/0004443 | A1 | | 1/2014 | Hong |
| 2014/0205921 | A1 | | 7/2014 | Kim |
| 2015/0044595 | A1 | | 2/2015 | Monden |
| 2021/0036334 | A1 | | 2/2021 | Kon |

FOREIGN PATENT DOCUMENTS

| | | | | |
|---|---|---|---|---|
| CN | 113226545 | A | | 8/2021 |
| EP | 248386 | A | * | 12/1987 .......... C01B 31/005 |
| EP | 0321298 | A2 | | 6/1989 |
| GB | 1313839 | A | * | 4/1973 ............. B01J 21/04 |
| JP | 01223196 | A | | 9/1989 |
| JP | 2002320854 | A | | 11/2002 |
| JP | 2006102568 | A | | 4/2006 |
| JP | 3982909 | B2 | | 9/2007 |
| JP | 2014011154 | A | | 1/2014 |
| JP | 2019194977 | A | | 11/2019 |
| KR | 20130014364 | A | | 2/2013 |
| KR | 20140093587 | A | | 7/2014 |
| KR | 101758442 | B1 | | 7/2017 |
| TW | 201715778 | A | | 5/2017 |
| WO | 2010033111 | A1 | | 3/2010 |
| WO | 2014126077 | A1 | | 8/2014 |

OTHER PUBLICATIONS

Cn office action dated Feb. 11, 2023.
International Search Report dated Apr. 8, 2020.
Pt3Fe /MWCNTs 燃料电池催化剂的制备及性能研究.
Surface Fluorination of Reactive Battery Anode Materials for Enhanced Stability.
Electrode architectures for high capacity multivalent conversion compounds: iron (II and III) fluoridet.

* cited by examiner

US 11,931,724 B2

CATALYST, METHOD FOR PRODUCING SAME, ELECTRODE COMPRISING SAME, MEMBRANE-ELECTRODE ASSEMBLY COMPRISING SAME, AND FUEL CELL COMPRISING SAME

CROSS REFERENCE TO RELATED APPLICATIONS

This application is a National Stage of International Application No. PCT/KR2019/017771 filed Dec. 16, 2019, claiming priority based on Korean Patent Application No. 10-2018-0169074 filed Dec. 26, 2018.

TECHNICAL FIELD

The present invention relates to a catalyst, a method for manufacturing the same, an electrode comprising the same, a membrane-electrode assembly comprising the same, and a fuel cell comprising the same. More particularly, the present invention relates to a catalyst which has fluorine (F) groups on the surface thereof so that it has improved interface properties with respect to an ionomer and thus exhibits excellent performance and durability, a method for manufacturing the same, an electrode comprising the same, a membrane-electrode assembly comprising the same, and a fuel cell comprising the same.

BACKGROUND ART

A fuel cell is an electric-power-generating system for directly converting the energy from a chemical reaction between oxygen and hydrogen contained in a hydrocarbon-based material such as methanol, ethanol, or natural gas into electric energy. A typical example of such a fuel cell is a polymer electrolyte membrane fuel cell (PEMFC). The PEMFC is in the spotlight as a next-generation energy source, and research into the commercialization thereof is actively being conducted owing to advantages such as environmental friendliness in the automotive field.

In the fuel cell system, a membrane-electrode assembly (MEA), which is the portion thereof that substantially generates electricity, has a structure in which a polymer electrolyte membrane containing a proton-conducting polymer is interposed between an anode (also called a "fuel electrode" or an "oxidization electrode") and a cathode (also called an "air electrode" or a "reduction electrode"). Each electrode is formed using a mixture of a catalyst, an ionomer, a solvent and an additive, and the catalyst is a major factor that determines the activity and durability of the fuel cell.

In general, in order to improve the catalytic activity while reducing the amount of the metal catalyst that is used, a catalyst including metal particles supported on a support is used for fuel cells.

The metal particles supported on the support should (i) be small in size, (ii) be uniformly distributed on the support to provide a wide range of catalytic active sites, and (iii) have a large surface area where redox reactions occur.

Meanwhile, the support should have a large surface area, large pore volume and high electrical conductivity.

The carbon supports currently and widely used have problems of a wide range of irregular pore structure, low pore volume, low electrical conductivity and the like.

Metal particles widely used for the anode and cathode include platinum, which is a precious metal, as a main raw material. Since platinum is very expensive, it is necessary to reduce the amount of platinum that is loaded without significantly reducing the electrochemical catalytic activity. Since the catalytic reaction mainly occurs in a liquid phase or gas phase, it is necessary to maximize the specific surface area per unit weight of the metal particles in order to improve the catalytic activity. The most effective method for this purpose is to minimize the size of the metal particles.

Therefore, the way in which the metal particles are supported on a support, the properties of the support material and the like are important factors in order to increase the active area of the catalyst.

Carbon materials widely used in the production of the supports include carbon black, activated carbon, carbon nanotube and the like, and a great deal of research and development thereon has been attempted. In particular, the methods of preparing a catalyst by doping or activating carbon black with various materials have recently been used in the production of a catalyst for a fuel cell. However, while the catalyst itself prepared by such methods shows improved activity, when made into an electrode, the improvement of the activity is insufficient, which is disadvantageous.

DISCLOSURE

Technical Problem

An aspect of the present invention is to provide a catalyst which has fluorine (F) groups on the surface thereof so that it has improved interface properties with respect to an ionomer and thus exhibits excellent performance and durability.

Another aspect of the present invention is to provide a method of manufacturing the catalyst described above.

Yet another aspect of the present invention is to provide an electrode comprising the catalyst.

Still yet another aspect of the present invention is to provide a membrane-electrode assembly comprising the electrode.

A further aspect of the present invention is to provide a fuel cell comprising the membrane-electrode assembly.

Technical Solution

In accordance with the aspect of the present invention, there is provided a catalyst comprising: a support; a metal particle supported on the support; and fluorine (F) groups formed on the surface of the support and the surface of the metal particle, respectively.

The support may be selected from the group consisting of carbon black, porous carbon, carbon fiber, carbon nanotube (CNT), carbon nanohorn, and graphene.

The metal particle may include at least one selected from the group consisting of platinum (Pt), palladium (Pd), ruthenium (Ru), iridium (Ir), osmium (Os), and a platinum-Me alloy, wherein Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y) and rhodium (Rh).

In accordance with another aspect of the present invention, there is provided a method of manufacturing a catalyst, the method comprising: preparing a support having a metal particle supported thereon; mixing a precursor, which is an organic fluorine compound monomer or an inorganic fluorine compound, with the support having the metal particle supported thereon to obtain a mixture, wherein the precursor is coated on each of a surface of the metal particle and a surface of the support by the mixing; and heat-treating the mixture at a temperature of 100 to 300° C., wherein fluorine (F) groups are formed on the surface of the metal particle and the surface of the support, respectively, by the heat treatment.

In the mixing step, the weight ratio of the precursor to the support having the metal particle supported thereon may be 1:2 to 1:50.

The organic fluorine compound monomer may include $R-F_x$, wherein R is an alkyl group, an aryl group, a benzyl group, a vinyl group, or an acyl group, and x is an integer of 1 to 6.

The inorganic fluorine compound may include $M-F_x$, wherein M is any one selected from the group consisting of H, $NH_4$, Ca, Si, P, B, and Al, or a compound of two or more thereof, and x is an integer of 1 to 6.

The mixing may be performed using at least one selected from the group consisting of a homogenizer, a high-pressure disperser, a ball mill, a powder mixer, and a resonance acoustic mixer.

The heat treatment may be performed for 2 to 4 hours in an inert gas atmosphere.

In accordance with yet another aspect of the present invention, there is provided an electrode comprising the aforementioned catalyst and an ionomer.

In accordance with still yet another aspect of the present invention, there is provided a membrane-electrode assembly comprising an anode, a cathode, and an ion exchange membrane interposed between the anode and the cathode, wherein at least one of the anode and the cathode is the aforementioned electrode.

In accordance with the further aspect of the present invention, there is provided a fuel cell comprising the aforementioned membrane-electrode assembly.

Advantageous Effects

According to the present invention, the surfaces of both support and metal particle supported thereon are modified with fluorine (F) groups so that the interface properties between the catalyst of the present invention and an ionomer can be improved and thus the performance and durability of the catalyst can also be increased. In addition, the catalyst can be utilized in various applications by appropriately adjusting the specific surface area of the metal particles depending on the use thereof according to the properties of various kinds of supports, and economic efficiency can be secured by reducing the amount of precious metal which is the material of the metal particles.

MODE OF INVENTION

Hereinafter, preferred embodiments of the present invention will be described in more detail. However, these embodiments are provided only for better understanding of the present invention and should not be construed as limiting the scope of the present invention, and the present invention is defined by the scope of the claims described below.

Figure 1:
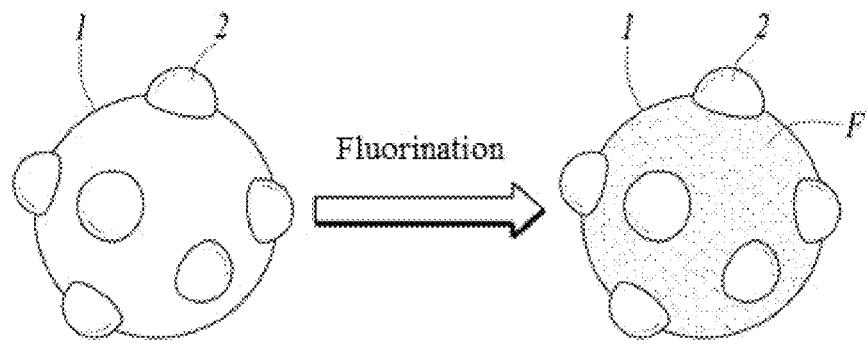
FIG. 1 is a schematic diagram illustrating a conventional catalyst and a catalyst according to an embodiment of the present invention.

FIG. 1 is a schematic diagram illustrating a conventional catalyst and a catalyst according to an embodiment of the present invention. Referring to FIG. 1, the catalyst according to the embodiment of the present invention includes a support 1, a metal particle 2 supported on the support 1, and fluorine (F) groups formed on the surface of the support 1 and the surface of the metal particle 2, respectively.

The support 1 of the present invention may be selected from (i) a carbon-based support, (ii) a porous inorganic oxide such as zirconia, alumina, titania, silica, ceria, etc., and (iii) a zeolite. The carbon-based support may be selected from carbon black, porous carbon, carbon nanotube (CNT), carbon nanohorn, graphene, super P, carbon fiber, carbon sheet, Ketjen black, acetylene black, carbon sphere, carbon ribbon, fullerene, activated carbon, and combinations of two or more thereof, but is not limited thereto. Any support that can be used in the art to which the present invention pertains may be used without limitation.

The metal particle 2 supported on the support 1 may be positioned on the surface of the support 1 or may penetrate into the support 1 while filling the pores in the support 1.

Any one that can be used as a catalyst in hydrogen oxidation reaction and/or oxygen reduction reaction can be used as the metal particle 2. For example, the metal particle 2 may include at least one platinum-based metal selected from the group consisting of platinum (Pt), palladium (Pd), ruthenium (Ru), iridium (Ir), osmium (Os), and platinum-Me alloys, but is not limited thereto.

Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y), and rhodium (Rh). That is, the platinum-Me alloy would be a binary alloy when Me represents one metal element, the platinum-Me alloy would be a ternary alloy when Me represents two metal elements, and the platinum-Me alloy would be a multi-component alloy when Me represents three or more metallic elements.

The metal particle 2 may be present in the catalyst in an amount of 10 to 80% by weight with respect to the total weight of the catalyst. If the content of the metal particle 2 is less than 10% by weight, the catalytic activity would be deteriorated. On the other hand, if the content of the metal particle 2 exceeds 80% by weight, the active area would be decreased due to agglomeration of the metal particle 2, thereby causing deterioration of the catalytic activity thereof.

The fluorine (F) group is distinguished from a conventional fluorine-containing polymer resin coating layer applied on a catalyst as a water-repellent layer, in that it is a functional group including only a fluorine atom and, on the surface of the catalyst, cannot be identified by the naked eye.

By forming fluorine groups on the surface of the catalyst (that is, by modifying the surface of the support 1 and the surface of the metal particle 2 with the fluorine group), the bonding strength between the catalyst and the ionomer can be improved, and the performance and durability of the catalyst can thus be maximized.

The method of preparing a catalyst according to the present invention comprises: preparing a support 1 having a metal particle 2 supported thereon; mixing a precursor, which is an organic fluorine compound monomer or an inorganic fluorine compound, with the support 1 having the metal particle 2 supported thereon to obtain a mixture, wherein the precursor is coated on each of the surface of the metal particle 2 and the surface of the support 1 by the mixing; and heat-treating the mixture, wherein fluorine (F) groups are formed on the surface of the metal particle 2 and the surface of the support 1, respectively, by the heat treatment.

According to the present invention, since the performance of the catalyst can be maximized by forming fluorine groups on the surface of the catalyst, economic efficiency can be secured by reducing the amount of catalyst that is used.

The support 1 having the metal particle 2 supported thereon can be obtained by purchasing a commercially available product or by disposing the metal particle 2 on the support 1. Since the process of disposing the metal particle 2 on the support 1 is well known in the art, a detailed description thereof will be omitted.

In the mixing step, the weight ratio of the precursor to the support 1 having the metal particle 2 supported thereon may be 1:2 to 1:50. When such a large amount of precursor is used that the weight ratio is out of this numerical range, problems of side reactions and catalyst deterioration may occur. On the other hand, when such a small amount of precursor is used that the weight ratio is out of the numerical range, a sufficient fluorination effect cannot be obtained, which is not preferable.

According to the present invention, as a fluorine-containing precursor for forming the fluorine groups on the surfaces of the metal particle 2 and support 1, an organic fluorine compound monomer or an inorganic fluorine compound is used, rather than a fluorine-containing polymer.

If a fluorine-containing polymer is used as the precursor, at least a part of the surface of the metal particle 2 as well as the surface of the support 1 would be coated with the polymer. The thick polymer coating layer reduces catalytic activity. In addition, since the coating layer is formed of a polymer, it is difficult to uniformly coat the entire surface of the catalyst. Furthermore, since a fluorine group would not exist on the surface of the catalyst after the heat treatment, it is difficult to achieve the object of the present invention.

The organic fluorine compound monomer that can be used in the method of the present invention may include R—$F_x$. R may be an alkyl group, an aryl group, a benzyl group, a vinyl group, or an acyl group, and x may be an integer of 1 to 6. More specifically, the organic fluorine compound monomer may be $C_2H_5F$ (ethyl fluoride), $C_7H_7F$ (benzyl fluoride), $CH_3COF$ (acetyl fluoride), $(CNF)_3$ (cyanuric fluoride), $C_2H_3F$ (vinyl fluoride), $(CH_3)_4NF$ (tetramethylammonium fluoride), or a mixture of two or more thereof, but is not limited thereto.

The inorganic fluorine compound that can be used in the method of the present invention may include M-$F_x$. M may be any one selected from the group consisting of H, $NH_4$, Ca, Si, P, B and Al, or a compound of two or more thereof, and x may be an integer of 1 to 6. More specifically, the inorganic fluorine compound may be HF, $NH_4F$, $CaF_2$, $SiF_6$, $PF_3$, $PF_5$, $(NH_4)_2SiF_6$, $ClF_6$, $NH_4BF_4$, $(NH_4)_2AlF_6$, or a mixture of two or more thereof, but is not limited thereto. Care should be taken when HF is used as a fluorine-containing precursor.

The step of mixing the support having the metal particle supported thereon with the organic fluorine compound monomer or inorganic fluorine compound may be performed using at least one selected from the group consisting of a homogenizer, a high-pressure disperser, a ball mill, a powder mixer, and a resonance acoustic mixer. Through such homogeneous mixing, the precursor can be uniformly coated on the surface of the metal particle 2 and the surface of the support 1, respectively.

The heat treatment may be performed in an inert gas (e.g., nitrogen gas) atmosphere. Through such heat treatment, fluorine groups can be uniformly formed on the surface of the metal particle 2 and the surface of the support 1, respectively. By adjusting (i) the type and/or content of the support 1, (ii) the type and/or content of the metal particle 2, (iii) the type and/or content of the precursor, and/or (iv) the temperature and/or time of the heat-treatment process, a catalyst having an optimized specific surface area can be obtained.

The heat-treatment temperature may be 100 to 300° C., more preferably about 200° C. When the heat-treatment temperature is lower than 100° C., the fluorine groups may be unstably formed on the surface of the catalyst and thus may be lost during the operation of the fuel cell, and when the heat-treatment temperature is higher than 300° C., the performance of the catalyst may be deteriorated due to the agglomeration of the metal particles 2 thereof.

The heat treatment time may be 2 to 4 hours, more preferably about 3 hours. When the heat treatment is performed for less than 2 hours, there may be no heat treatment effect, and when the heat treatment is performed for more than 4 hours, the performance of the catalyst may be degraded due to the agglomeration of the metal particle 2 thereof.

The electrode of the present invention comprises the catalyst of the present invention described above and an ionomer mixed with the catalyst.

The ionomer may be a cation conductor having a cation exchange group capable of exchanging a cation such as a proton, or an anion conductor having an anion exchange group capable of exchanging an anion such as a hydroxyl ion, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and generally may be a sulfonic acid groups or a carboxyl group.

The cation conductor includes a cation exchange group and may be: a fluorine-based polymer containing fluorine in the main chain; a hydrocarbon-based polymer such as benzimidazole, polyamide, polyamideimide, polyimide, polyacetal, polyethylene, polypropylene, an acrylic resin, polyester, poly sulfone, polyether, polyetherimide, polyethersulfone, polycarbonate, polystyrene, polyphenylene sulfide, polyether ether ketone, polyether ketone, polyaryl ether sulfone, polyphosphazene or polyphenylquinoxaline; a partially fluorinated polymer such as polystyrene-graft-ethylenetetrafluoroethylene copolymer or poly styrene-graft-polytetrafluoroethylene copolymer; a sulfone imide, or the like.

More specifically, when the cation conductor is a proton conductor, the polymers may include a cation exchange group selected from the group consisting of a sulfonic acid group, a carboxylic acid group, a phosphoric acid group, a phosphonic acid group and derivatives thereof in the side chain thereof. Specific examples thereof include, but are not limited thereto: fluoro-based polymers such as poly(perfluorosulfonic acid), poly(perfluorocarboxylic acid), copolymers of fluorovinyl ether and tetrafluoroethylene including a sulfonic acid group, defluorinated sulfided polyetherketone, and mixtures thereof; and hydrocarbon-based polymers such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof.

In the cation conductor, H in the cation exchange group of the side chain end may be substituted with Na, K, Li, Cs or tetrabutylammonium. When substituting H with Na in the cation exchange group of the side chain end, NaOH may be used during the preparation of the carbon structure composition. When substituting H with tetrabutylammonium hydroxide in the cation exchange group of the side chain end, tetrabutylammonium hydroxide may be used. H can also be substituted with K, Li or Cs using an appropriate compound. Since the substitution method is well known in the art, a detailed description thereof will be omitted here.

The cation conductor can be used in the form of a single substance or a mixture, and can also be optionally used in combination with a nonconductive compound to further improve adhesion with the ion exchange membrane. The amount of the cation conductor is preferably adjusted depending on the intended use thereof.

As the nonconductive compound, one or more selected from the group consisting of polytetrafluoroethylene (PTFE), tetrafluoroethylene-hexafluoropropylene copolymers (FEP), tetrafluoroethylene-perfluoroalkyl vinyl ether copolymers (PFA), and ethylene/tetrafluoroethylene (ETFE), ethylene chlorotrifluoro-ethylene copolymers (ECTFE), polyvinylidene fluoride, polyvinylidene fluoride-hexafluoropropylene copolymer (PVdF-HFP), dodecylbenzenesulfonic acid, and sorbitol may be used.

Generally, a metal hydroxide-doped polymer may be used as the anion conductor. Specifically, the anion conductor may be a metal hydroxide-doped poly(ethersulfone), polystyrene, a vinyl polymer, poly(vinyl chloride), poly(vinylidene fluoride), poly(tetrafluoroethylene), poly(benzimidazole), or poly(ethylene glycol).

Examples of commercially available ionomers include Nafion, Aquivion and the like.

The ionomer may be present in an amount of 20 to 45% by weight, and specifically 25 to 38% by weight, based on the total weight of the electrode. If the content of the ionomer is less than 20% by weight, the performance of the fuel cell would be degraded. On the other hand, if the content of the ionomer exceeds 45% by weight, the excessive amount of the ionomer would cause agglomeration in some portions of the ionomer.

The method of manufacturing an electrode includes preparing an electrode-forming composition including the catalyst and the ionomer, and coating the electrode-forming composition to form the electrode.

First, an electrode-forming composition including the catalyst and the ionomer is prepared.

The electrode-forming composition may be prepared by adding the catalyst and the ionomer to a solvent and then dispersing the resulting mixture using any one dispersion method selected from ultrasonic dispersion, stirring, 3-roll milling, planetary stirring, high-pressure dispersion and combinations thereof.

The catalyst may be dispersed in a soaking solution and then mixed with the ionomer, or may be added in the form of a solid to the ionomer.

The solvent may be a solvent selected from the group consisting of water, a hydrophilic solvent, an organic solvent and mixtures thereof.

The hydrophilic solvent may have at least one functional group selected from the group consisting of alcohols, ketones, aldehydes, carbonates, carboxylates, carboxylic acids, ethers and amides containing, as a main chain, a linear, branched, saturated or unsaturated hydrocarbon having 1 to 12 carbon atoms. These may include an alicyclic or aromatic cyclic compound as at least a part of the main chain. Specific examples thereof include: alcohols such as methanol, ethanol, isopropyl alcohol, ethoxy ethanol, n-propyl alcohol, butyl alcohol, 1,2-propanediol, 1-pentanol, 1,5-pentanediol, 1,9-nonanediol and the like; ketones such as heptanone and octanone; aldehydes such as benzaldehyde and tolualdehyde; esters such as methyl pentanoate and ethyl-2-hydroxypropanoate; carboxylic acids such as pentanoic acid and heptanoic acid; ethers such as methoxybenzene and dimethoxypropane; and amides such as propanamide, butylamide and dimethylacetamide.

The organic solvent may be selected from N-methylpyrrolidone, dimethyl sulfoxide, tetrahydrofuran and mixtures thereof.

The solvent may be present in an amount of 80% to 95% by weight based on the total weight of the electrode-forming composition. If the content of the solvent is less than 80% by weight, the excessively high content of solids in the composition might cause, during the coating process, a dispersion problem due to high viscosity and a problem of cracks. On the other hand, if the content of the solvent is greater than 95% by weight, there may be a disadvantage in terms of electrode activity.

Next, the electrode is produced by coating the electrode-forming composition.

As a specific example, the production of the electrode may include coating a release film with the electrode-forming composition to produce an electrode and transferring the electrode to an ion exchange membrane.

When the release film is coated with the electrode-forming composition, it is desirable that composition including the active material dispersed therein is continuously or intermittently transferred to a coater, and then uniformly applied on the release film to have a thickness of 1 µm to 200 µm after dried.

More specifically, the electrode-forming composition is continuously transferred to a coater such as a die coater, gravure coater, bar coater, or comma coater through a pump depending on the viscosity thereof, and then uniformly applied on a decal film in such an amount that a resulting dry electrode layer can have a thickness of 1 µm to 200 µm, more preferably 3 µm to 20 µm, using a method such as slot die coating, bar coating, comma coating, screen printing, spray coating, doctor blade coating or brushing. Then, the coated decal film is passed through a drying furnace maintained at a constant temperature so that the solvent can be volatilized.

If the electrode-forming composition is coated at a thickness of less than 1 µm, the activity of the catalyst would be reduced due to the small catalyst content. On the other hand, if the composition is coated at a thickness exceeding 200 µm, the required movement distance of ions and electrons would increase, thereby increasing resistance.

The drying process may be carried out at 25° C. to 90° C. for 12 hours or longer. If the drying temperature is less than 25° C. and the drying time is shorter than 12 hours, a sufficiently dried electrode cannot be formed. On the other hand, and if the drying is conducted at a temperature higher than 90° C., a crack might occur in the electrode.

However, the methods of applying and drying the electrode-forming composition are not limited to the ones described above.

Optionally, the method may further include, after drying the electrode-forming composition to produce the electrode, cutting the dried electrode and the release film into a desired size and bonding the same to the ion exchange membrane.

The ion exchange membrane includes an ion conductor. The ion conductor may be a cation conductor having a functional group capable of delivering a cation such as a proton, or an anion conductor having a functional group capable of delivering an anion such as a hydroxyl ion, carbonate or bicarbonate. Since the cation conductor and the anion conductor are the same as those described above, a repeated description is omitted.

The ion exchange membrane may be a reinforced membrane in which the ion conductor fills the pores of a fluorine-based porous support such as e-PTFE or a porous nanoweb support prepared by electrospinning or the like.

A method of bonding the electrode to the ion exchange membrane may be, for example, a transfer method. The transfer method may be performed by hot pressing, i.e., applying heat and pressure using a metal press alone or a metal press with a soft plate of a rubber material such as silicone rubber thereon.

The transfer method may be carried out under conditions of 80° C. to 150° C. and 50 kgf/cm$^2$ to 200 kgf/cm$^2$. If the hot pressing is performed at a temperature lower than 80° C. and at a pressure lower than 50 kgf/cm$^2$, the transfer of the electrode formed on the release film may not be properly performed. On the other hand, if the hot pressing is performed at a temperature higher than 150° C., the polymer of the ion exchange membrane burns and thus a structural deformation of the electrode might be caused. If the hot pressing is performed at a pressure greater than 200 kgf/cm$^2$, the electrode would be more likely to be compressed rather than transferred to the ion exchange membrane, and thus the transfer may not be performed properly.

The membrane-electrode assembly according to the present invention includes an anode, a cathode, and an ion exchange membrane between the anode and the cathode, wherein at least one of the anode and the cathode is the electrode according to the present invention described above.

Since the electrode, the method for manufacturing, and the ion exchange membrane are the same as those described above, a repeated description thereof will be omitted.

Figure 2:
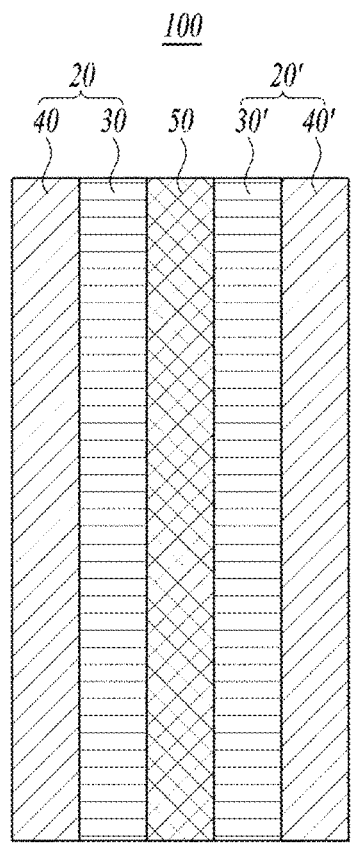
FIG. 2 is a schematic diagram showing a membrane-electrode assembly according to an embodiment of the present invention.

FIG. 2 is a schematic sectional view showing a membrane-electrode assembly according to an embodiment of the present invention. Referring to FIG. 2, the membrane-electrode assembly 100 comprises an ion exchange membrane 50 and electrodes 20 and 20' disposed on respective surfaces of the ion exchange membrane 50. The electrodes 20 and 20' comprise electrode substrates 40 and 40' and catalyst layers 30 and 30' respectively formed on the surfaces of the electrode substrates 40 and 40', and may further comprise microporous layers (not shown) between the electrode substrates 40 and 40' and the catalyst layers 30 and 30', the microporous layers including conductive fine particles such as carbon powder, carbon black and etc. so that materials can be diffused well in the electrode substrates 40 and 40'.

In the membrane-electrode assembly 100, the electrode 20, which is disposed on one surface of the ion exchange membrane 50 and causes an oxidation reaction to generate hydrogen ions and electrons from fuel transferred to the catalyst layer 30 through the electrode substrate 40, is referred to as an "anode", and the electrode 20', which is disposed on the other surface of the ion exchange membrane 50 and causes a reduction reaction to generate water from the hydrogen ions supplied through the ion exchange membrane 50 and an oxidizing agent transferred to the catalyst layer 30' through the electrode substrate 40', is referred to as a "cathode".

At least one of the catalyst layer 30 of the anode 20 and the catalyst layer 30' of the cathode 20' includes the catalyst according to an embodiment of the present invention described above.

The electrode substrates 40 and 40' may be porous conductive substrates to ensure the smooth supply of hydrogen or oxygen. Typical examples thereof include a carbon paper, a carbon cloth, a carbon felt or a metal cloth (a porous film including a fibrous metal cloth or a polymer fiber-made cloth with a metal film formed thereon), but are not limited thereto. The electrode substrates 40 and 40' are preferably waterproof-treated with a fluorine-based resin in order to prevent deterioration in the reactant diffusion efficiency which otherwise might be caused by the water generated during the operation of the fuel cell. Examples of the fluorine-based resin include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene or copolymers thereof.

The membrane-electrode assembly 100 can be produced according to a conventional method of manufacturing a membrane-electrode assembly except that the electrodes according to an embodiment of the present invention are used as the anode 20 and/or the cathode 20'.

The fuel cell of the present invention includes the membrane-electrode assembly of the present invention described above.

Figure 3:
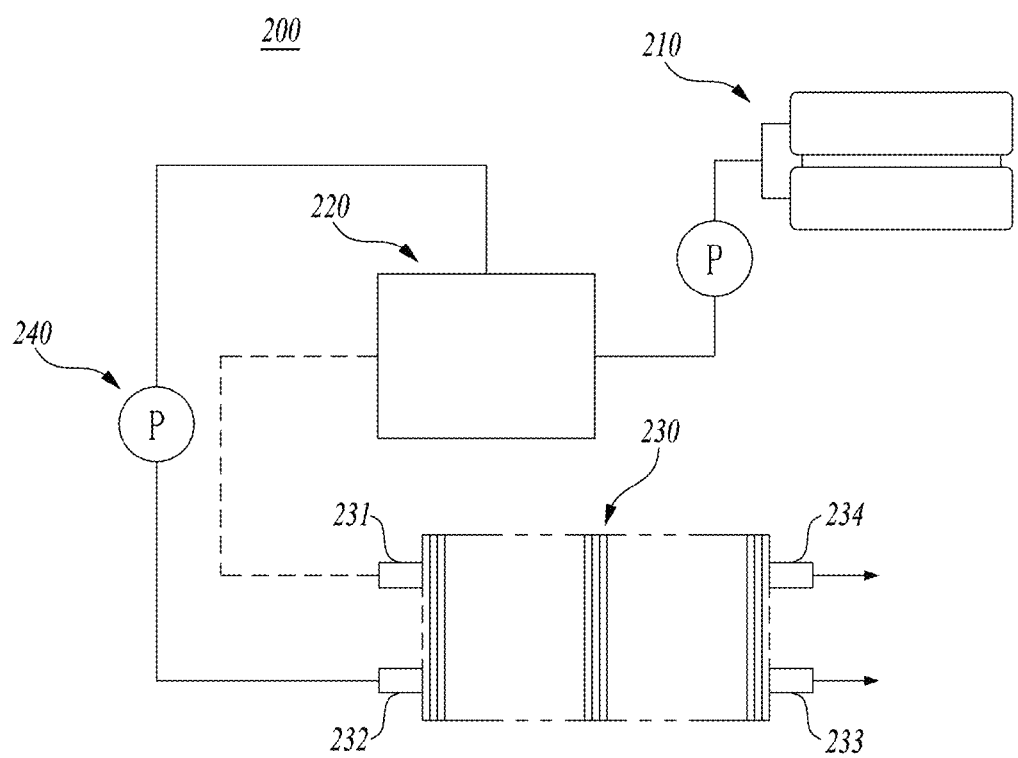
FIG. 3 is a schematic diagram showing the overall configuration of a fuel cell according to an embodiment of the present invention.

FIG. 3 is a schematic diagram showing the overall configuration of a fuel cell according to an embodiment of the present invention. Referring to FIG. 3, the fuel cell 200 comprises a fuel feeder 210 for feeding a fuel mixture of a fuel and water, a reformer 220 for reforming the fuel mixture to generate a reformed gas including hydrogen gas, a stack 230 for generating electrical energy through electrochemical reaction between an oxidizing agent and the reformed gas including hydrogen gas supplied from the reformer 220, and an oxidizing agent feeder 240 for feeding the oxidizing agent to the reformer 220 and the stack 230.

The stack 230 includes a plurality of unit cells for generating electrical energy by inducing an oxidation/reduction reaction between the reformed gas including hydrogen gas supplied from the reformer 220 and the oxidizing agent supplied from the oxidizing agent feeder 240.

Each unit cell refers to a cell of a unit for generating electricity, and comprises: a membrane-electrode assembly for oxidizing the reformed gas including hydrogen gas and reducing oxygen in the oxidizing agent; and separator plates (also called "bipolar plates") for feeding the reformed gas including the hydrogen gas and the oxidizing agent to the membrane-electrode assembly. The membrane-electrode assembly is interposed between the separator plates. The separator plates respectively located at the outermost sides of the stack are specifically referred to as "end plates".

The one end plate of the separator plates is provided with a pipe-shaped first supply pipe 231 for introducing the reformed gas including hydrogen gas supplied from the reformer 220 and a pipe-shaped second supply pipe 232 for introducing oxygen gas. The other end plate is provided with a first discharge pipe 233 for discharging the reformed gas including the remaining hydrogen gas unreacted in the plurality of unit cells to the outside and a second discharge pipe 234 for discharging the remaining oxidizing agent unreacted in the unit cells to the outside.

The electrode is applicable to various fields such as secondary batteries or capacitors, in addition to the membrane-electrode assembly for fuel cells.

Hereinafter, the present invention will be described in more detail with reference to examples. However, these examples are provided only for illustration of the present invention, and should not be construed as limiting the scope of the present invention. In addition, contents not described herein can be sufficiently technically conceived by those skilled in the art, and a description thereof will thus be omitted.

1. Preparation Example: Preparation of Catalyst (1) Example 1: Preparation of Catalyst Using Inorganic Fluorine Compound Precursor 1.0 g of a commercially available Pt/C catalyst and 0.1 g of $NH_4F$ inorganic fluorine compound precursor were added to a reaction vessel. Subsequently, the commercial catalyst and precursor were homogeneously mixed with each other using a homogenizer. The mixture thus obtained was heat-treated at a temperature of 200° C. for 3 hours in a nitrogen atmosphere to prepare a catalyst having fluorine groups formed on the surface thereof.

(2) Example 2: Preparation of Catalyst Using Inorganic Fluorine Compound Precursor 1.0 g of a commercially available PtCo/C catalyst and 0.1 g of $NH_4F$ inorganic fluorine compound precursor were added to a reaction vessel. Subsequently, the commercial catalyst and precursor were homogeneously mixed with each other using a homogenizer. The mixture thus obtained was heat-treated at a temperature of 200° C. for 3 hours in a nitrogen atmosphere to prepare a catalyst having fluorine groups formed on the surface thereof.

(3) Example 3: Preparation of Catalyst Using Inorganic Fluorine Compound Precursor 1.0 g of a commercially available Pt/GC (GC: graphitic carbon) catalyst the support of which has high durability and 0.1 g of $NH_4F$ inorganic fluorine compound precursor were added to a reaction vessel. Subsequently, the commercial catalyst and precursor were homogeneously mixed with each other using a homogenizer. The mixture thus obtained was heat-treated at a temperature of 200° C. for 3 hours in a nitrogen atmosphere to prepare a catalyst having fluorine groups formed on the surface thereof.

(4) Example 4: Preparation of Catalyst Using Organic Fluorine Compound Monomer Precursor 1.0 g of a commercially available Pt/C catalyst, 0.1 g of benzyl fluoride (organic fluorine compound monomer precursor) and 0.05 g of formaldehyde (crosslinking agent) were added to a reaction vessel. Subsequently, the commercial catalyst, precursor and crosslinking agent were homogeneously mixed with each other using a homogenizer. The mixture thus obtained was heat-treated at a temperature of 200° C. for 3 hours in a nitrogen atmosphere to prepare a catalyst having fluorine groups formed on the surface thereof.

(5) Comparative Example 1: Commercially Available Catalyst (Pt/C)

1.0 of a commercially available Pt/C catalyst was used.

(6) Comparative Example 2: Commercially Available Catalyst (PtCo/C)

1.0 of a commercially available PtCo/C catalyst was used.

(7) Comparative Example 3: Commercially Available Catalyst (Pt/GC)

1.0 of a commercially available Pt/GC catalyst was used.

(8) Comparative Example 4: Preparation of Catalyst Using Surface-Fluorinated Support 0.5 g of a commercially available carbon support and 0.05 g of $NH_4F$ inorganic fluorine compound precursor were added to a reaction vessel. Subsequently, the carbon support and precursor were homogeneously mixed with each other using a homogenizer. The mixture thus obtained was heat-treated at a temperature of 200° C. for 3 hours in a nitrogen atmosphere to prepare a support including fluorine groups formed on the surface thereof.

Subsequently, the surface-fluorinated support was homogeneously dispersed in water, and 5 mL of a $H_2PtCl_6$ solution (metal particle precursor) was added thereto. Then, a $NaBH_4$ solution (reducing agent) was added thereto to form metal particles on the support, followed by drying to obtain a catalyst.

Figure 4:
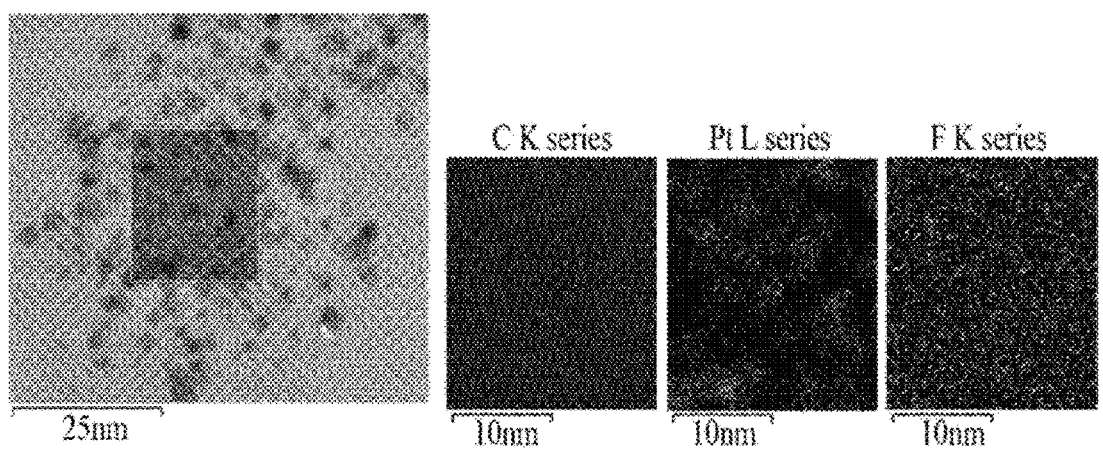
FIG. 4 shows the result of elemental analysis of the catalyst in accordance with Example 1 of the present invention.

2. Experimental Example 1: Results of Transmission Electron Microscopy and Elemental Analysis of Catalyst The result of elemental analysis of the catalyst prepared in Example 1 is shown in FIG. 4. The elemental analysis was performed through energy dispersive spectrometry (EDS) analysis in a scanning transmission electron microscopy (STEM) mode of a transmission electron microscope (TEM). As can be seen from FIG. 4, fluorine groups were evenly formed on the surface of the metal particles Pt and the surface of the support C.

Figure 5:
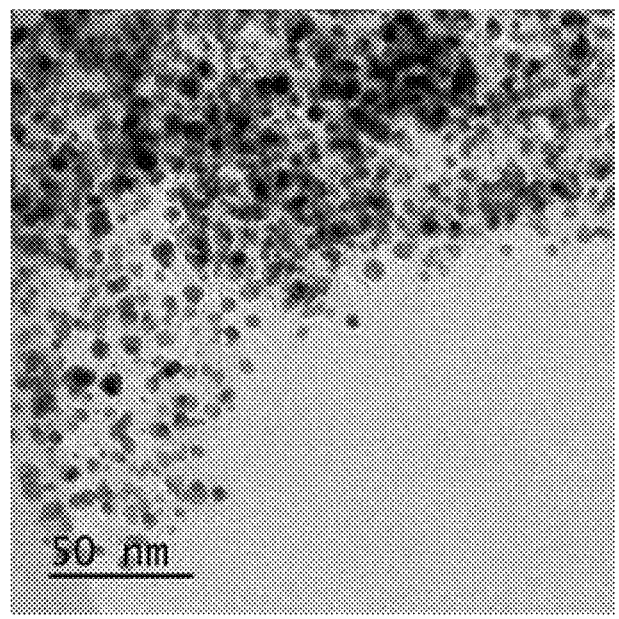
FIG. 5 is a transmission electron microscope (TEM) image of the catalyst in accordance with Comparative Example 2 of the present invention.
Figure 6:
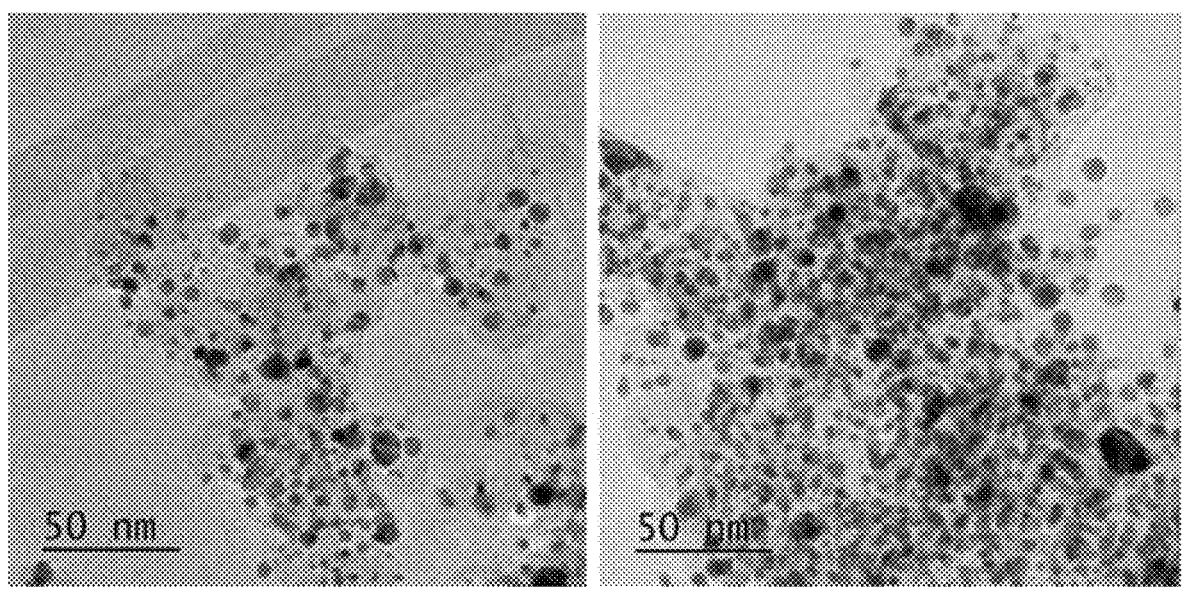
FIG. 6 is a transmission electron microscope (TEM) image of the catalyst in accordance with Example 2 of the present invention.

Transmission electron microscope (TEM) images of the catalysts prepared in Comparative Example 2 and Example 2 are shown in FIGS. 5 and 6. As can be seen from 5 and 6, in the case of the PtCo/C catalyst, two repeated experiments showed that there was no change in the catalyst between before the fluorination (FIG. 5) and after the fluorination (FIG. 6), which means that the fluorination according the present invention facilitates a PtCo/C catalyst having fluorine groups formed on the surface thereof without significantly affecting the metal particles.

Figure 7:
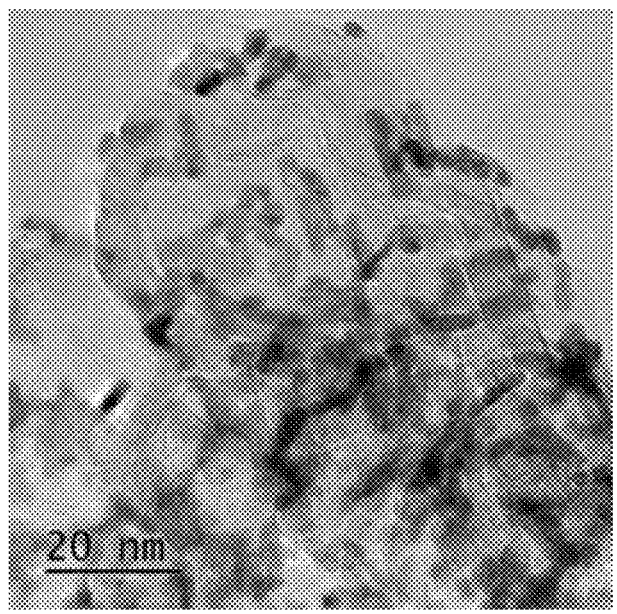
FIG. 7 is a transmission electron microscope (TEM) image of the catalyst in accordance with Comparative Example 3 of the present invention.
Figure 8:
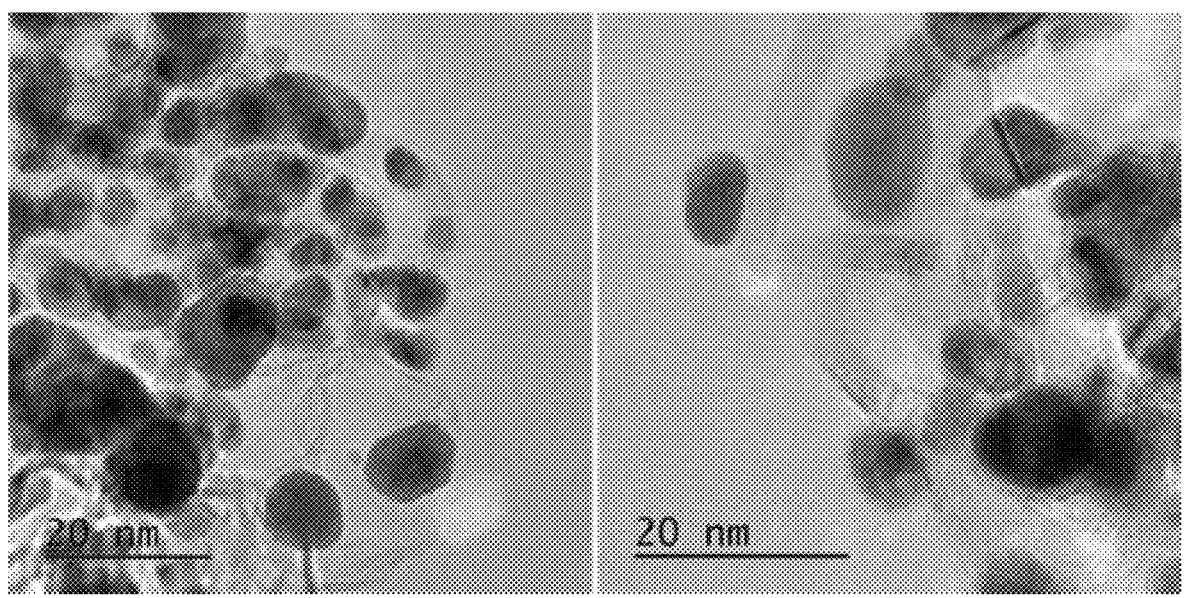
FIG. 8 is a transmission electron microscope (TEM) image of the catalyst in accordance with Example 3 of the present invention.

Transmission electron microscope (TEM) images of the catalysts prepared in Comparative Example 3 and Example 3 are shown in FIGS. 7 and 8. As can be seen from FIGS. 7 and 8, in the case of the Pt/GC catalyst having a highly durable support, the results of two repeated experiments showed that the metal particles were small before the fluorination (FIG. 7), but the metal particles agglomerated together and grew after the fluorination (FIG. 8). Therefore, when using a highly durable support, it is necessary to optimize the selection of the precursor, heat-treatment temperature, and heat-treatment time.

Figure 9:
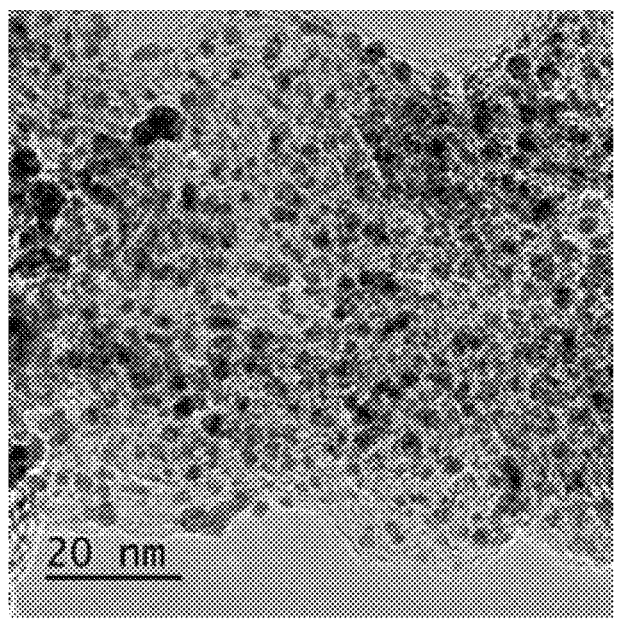
FIG. 9 is a transmission electron microscope (TEM) image of the catalyst in accordance with Comparative Example 1 of the present invention.
Figure 10:
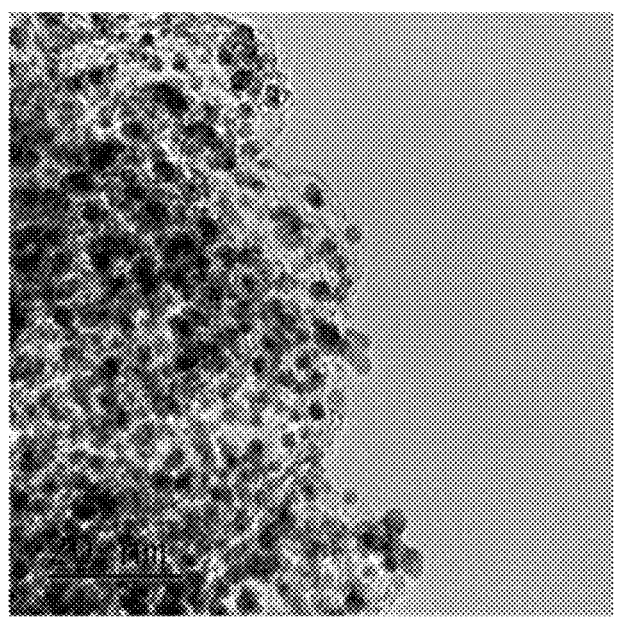
FIG. 10 is a transmission electron microscope (TEM) image of the catalyst in accordance with Example 4 of the present invention.

Transmission electron microscope (TEM) images of the catalysts prepared in Comparative Example 1 and Example 4 are shown in FIGS. 9 and 10. As can be seen from FIGS. 9 and 10, in the case of the Pt/C commercial catalyst, there was no considerable change in the catalyst between before the fluorination (FIG. 9) and after the fluorination (FIG. 10), which means that the metal particles were not significantly affected by the fluorination. However, an amorphous layer appeared around the catalyst particle, which means that a little fluorine-containing resin layer was present on the surface of the catalyst.

3. Experimental Example 2: Results of BET and XRD Analysis of Catalyst

Figure 11:
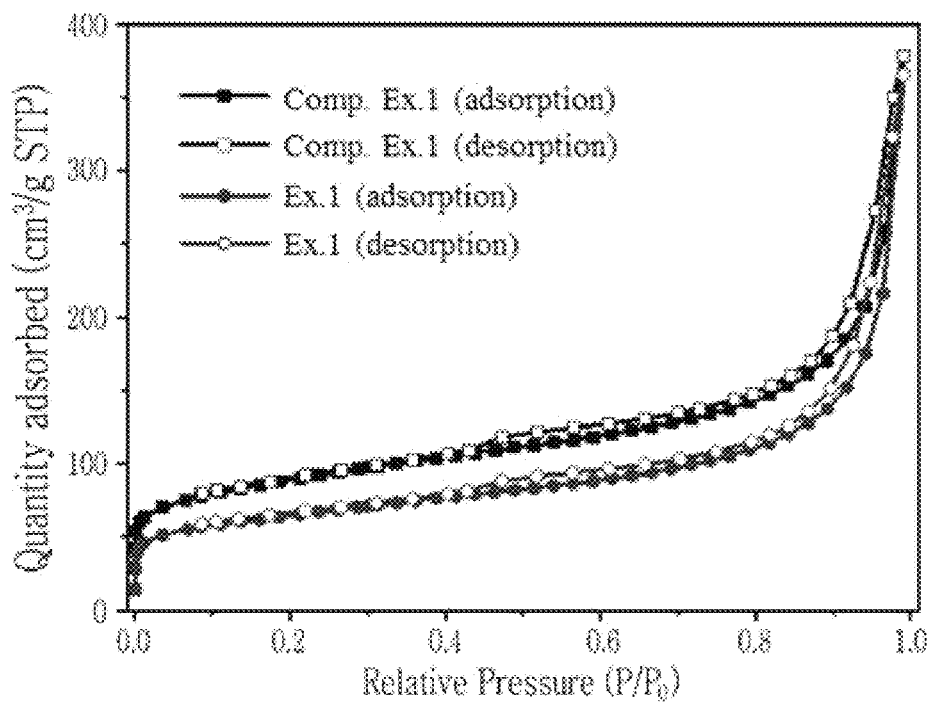
FIG. 11 is a graph showing the results of BET analysis of the catalysts in accordance with Example 1 and Comparative Example 1 of the present invention.
Figure 12:
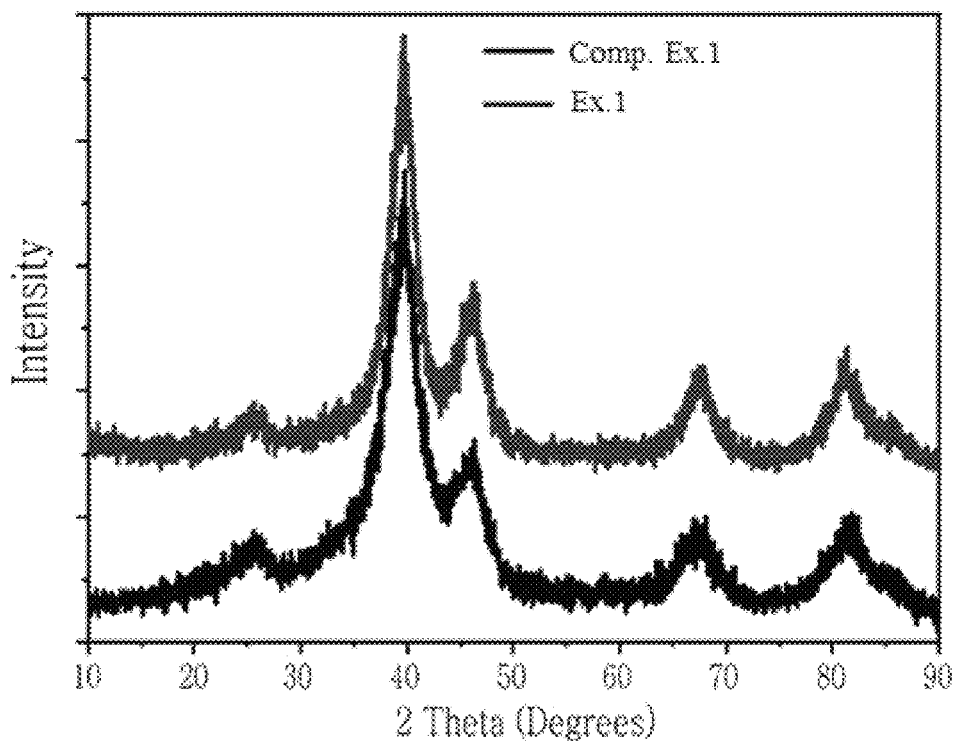
FIG. 12 is a graph showing the results of XRD analysis of the catalysts in accordance with Example 1 and Comparative Example 1 of the present invention.

The results of BET and XRD analysis of the catalysts prepared in Example 1 and Comparative Example 1 are shown in FIGS. 11 and 12, respectively. As can be seen from to FIG. 11, in the case of the Pt/C catalyst, the specific surface area and the micropores of Example 1 catalyst having the fluorine groups formed on the surface thereof were relatively small, i.e., the fluorination reduced them. This result means that the catalyst was stabilized due to the fluorination. On the other hand, as can be seen from FIG. 12, there was no significant difference in the XRD results between before and after the fluorination, which means that the fluorination did not affect the metal particles.

Figure 13:
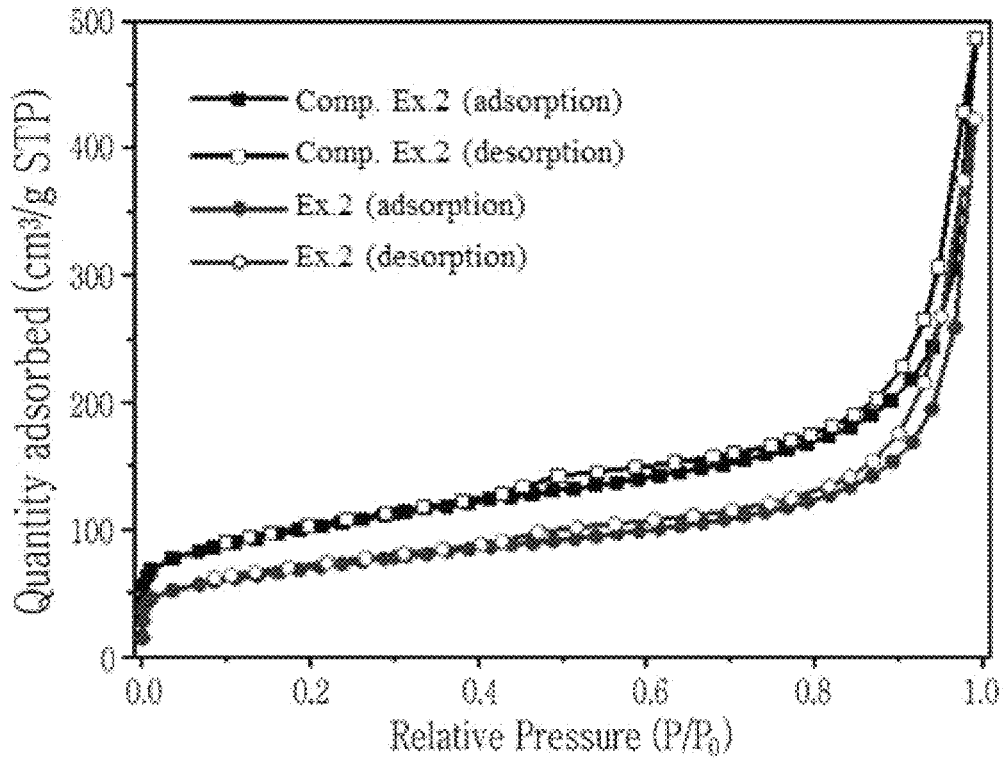
FIG. 13 is a graph showing the results of BET analysis of the catalysts in accordance with Example 2 and Comparative Example 2 of the present invention.
Figure 14:
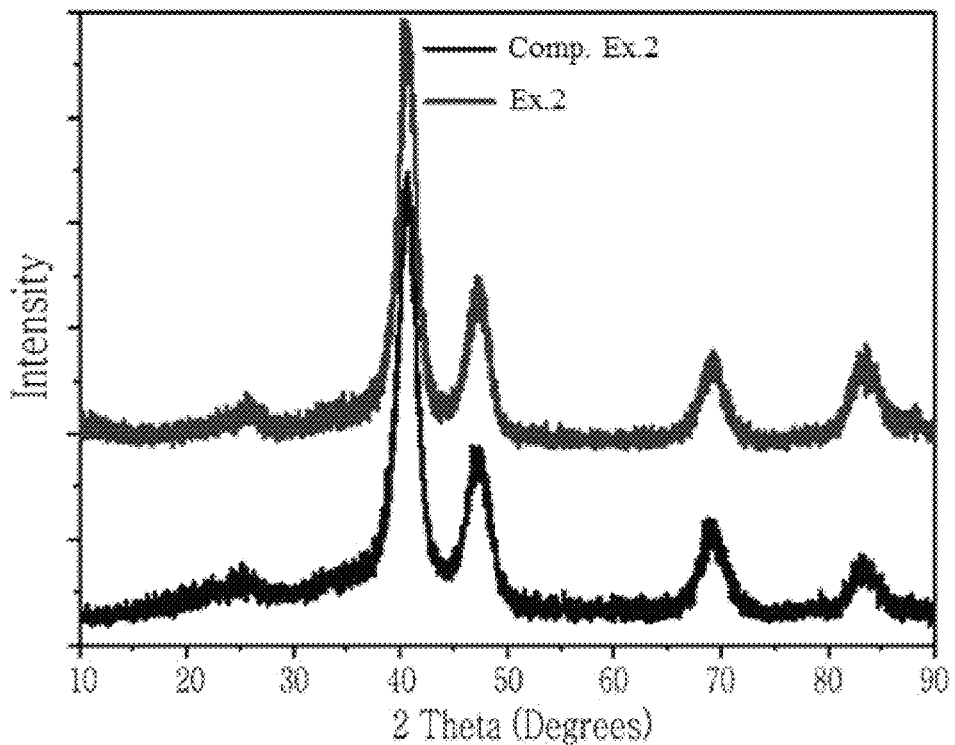
FIG. 14 is a graph showing the results of XRD analysis of the catalysts in accordance with Example 2 and Comparative Example 2 of the present invention.

The results of BET and XRD analysis of the catalysts prepared in Example 2 and Comparative Example 2 are shown in FIGS. 13 and 14, respectively. As can be seen from FIG. 13, in the case of the PtCo/C catalyst also, the specific surface area and the micro pores of the Example 2 catalyst having the fluorine groups formed on the surface thereof were relatively small, i.e., the fluorination reduced them. This result means that the catalyst was stabilized due to the fluorination. On the other hand, as can be seen from FIG. 14, there was no significant difference in the XRD results between before and after the fluorination, which means that the fluorination did not affect the metal particles.

Figure 15:
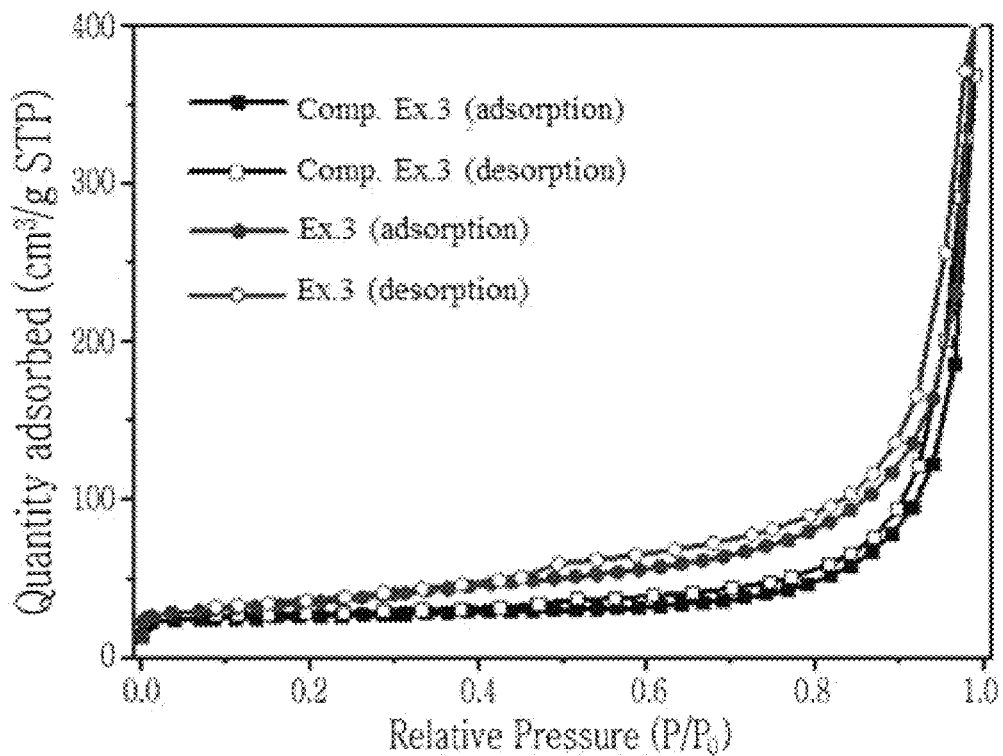
FIG. 15 is a graph showing the results of BET analysis of the catalysts in accordance with Example 3 and Comparative Example 3 of the present invention.
Figure 16:
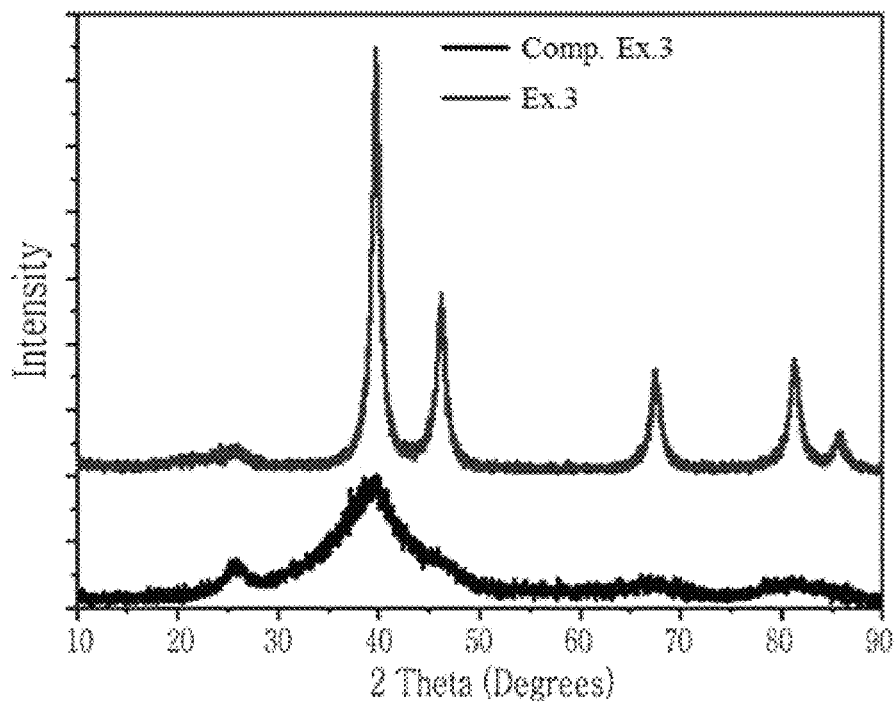
FIG. 16 is a graph showing the results of XRD analysis of the catalysts in accordance with Example 3 and Comparative Example 3 of the present invention.

The results of BET and XRD analysis of the catalysts prepared in Example 3 and Comparative Example 3 are shown in FIGS. 15 and 16, respectively. As can be seen from FIGS. 15 and 16, in the case of the Pt/GC catalyst having a highly durable support, the specific surface area and the micropores of the Example 3 catalyst having the fluorine groups formed on the surface thereof were relatively large, i.e., the fluorination increased them. It is presumed that the precursor caused separation between respective supports of the commercial catalyst, thereby increasing the micropores. This results in separation of the metal particles and thus agglomeration of the metal particles. Just like the TEM analysis result, the XRD analysis result also showed that the particle size increased.

Figure 17:
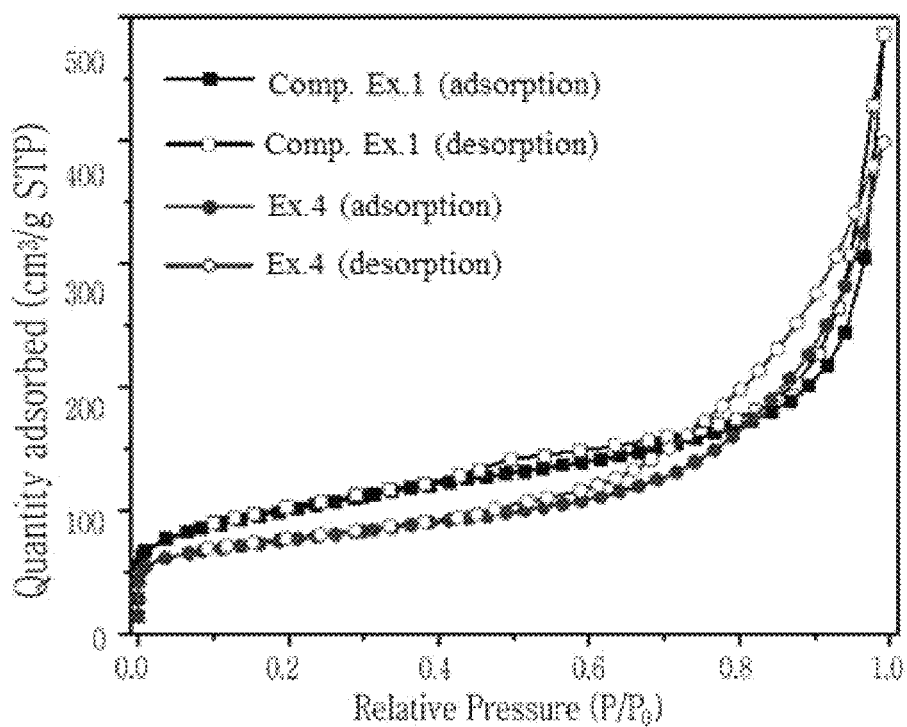
FIG. 17 is a graph showing the results of BET analysis of the catalysts in accordance with Example 4 and Comparative Example 1 of the present invention.
Figure 18:
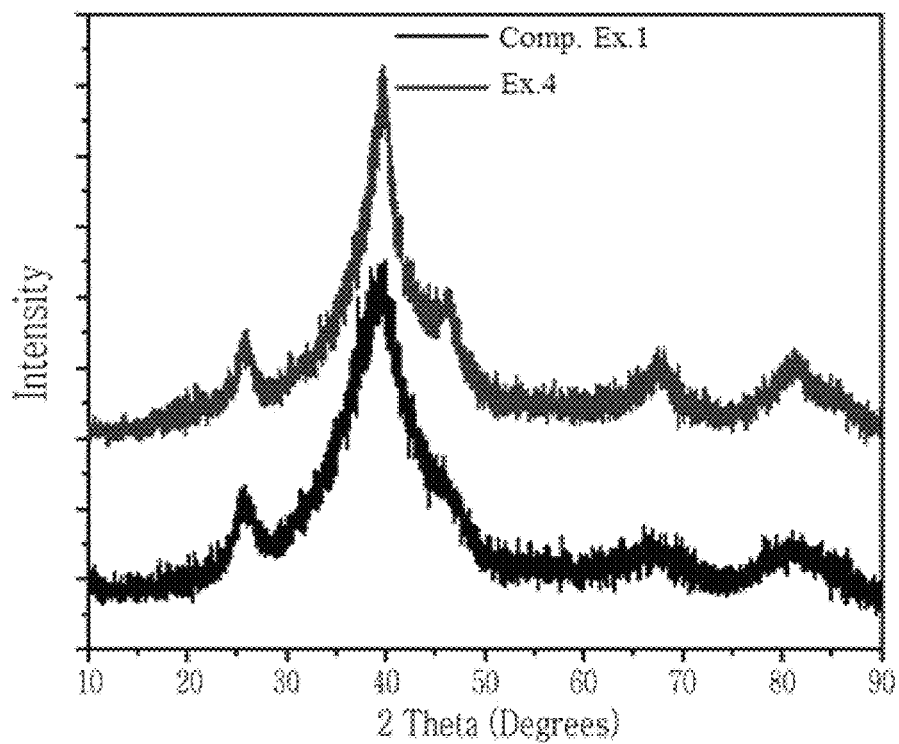
FIG. 18 is a graph showing the results of XRD analysis of the catalysts in accordance with Example 4 and Comparative Example 1 of the present invention.

The results of BET and XRD analysis of the catalysts prepared in Example 4 and Comparative Example 1 are shown in FIGS. 17 and 18, respectively. As can be seen from FIG. 17, the specific surface area and the micropores of the catalyst of Example 4 having fluorine groups formed on the surface of the Pt/C catalyst using an organic precursor, were decreased. This result means that the catalyst was stabilized due to the fluorination. On the other hand, the macropores were increased due to the influence of the fluorine-containing resin layer formed on the surface of the catalyst. In addition, as can be seen from FIG. 18, there was no significant difference in the XRD result between before and after the fluorination, which means that the fluorination did not affect the metal particles.

4. Experimental Example 3: Cyclovoltammetry (CV) Evaluation

Each of the catalysts prepared in Examples and Comparative Examples was added to the solution prepared by mixing an ionomer with isopropanol, and then sonicated to prepare an electrode-forming composition.

Subsequently, the electrode-forming composition was applied to a rotating disk electrode made of a glass carbon material and then dried to prepare a working electrode (active area of 0.196 cm$^2$).

Cyclovoltammetry (CV) activity was measured in a 1M HClO$_4$ electrolyte solution using an electrochemical measuring device with the working electrode, an Ag/AgCl electrode (reference electrode), and a platinum wire (counter electrode).

Figure 19:
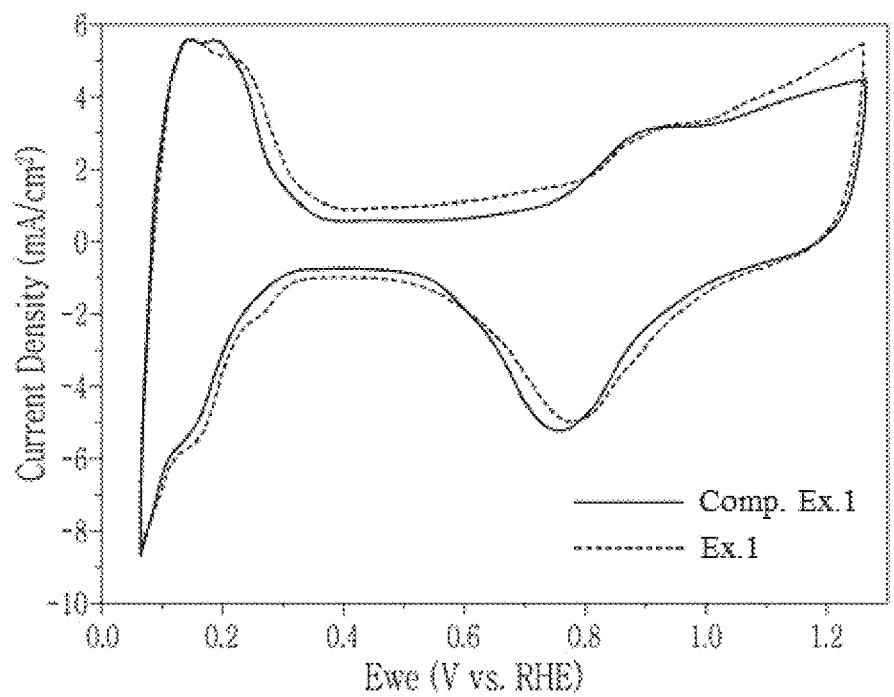
FIG. 19 is a graph showing the results of measurement of the cyclovoltammetry (CV) activity of electrodes each including the catalysts of Example 1 and Comparative Example 1 according to the present invention, respectively.
Figure 20:
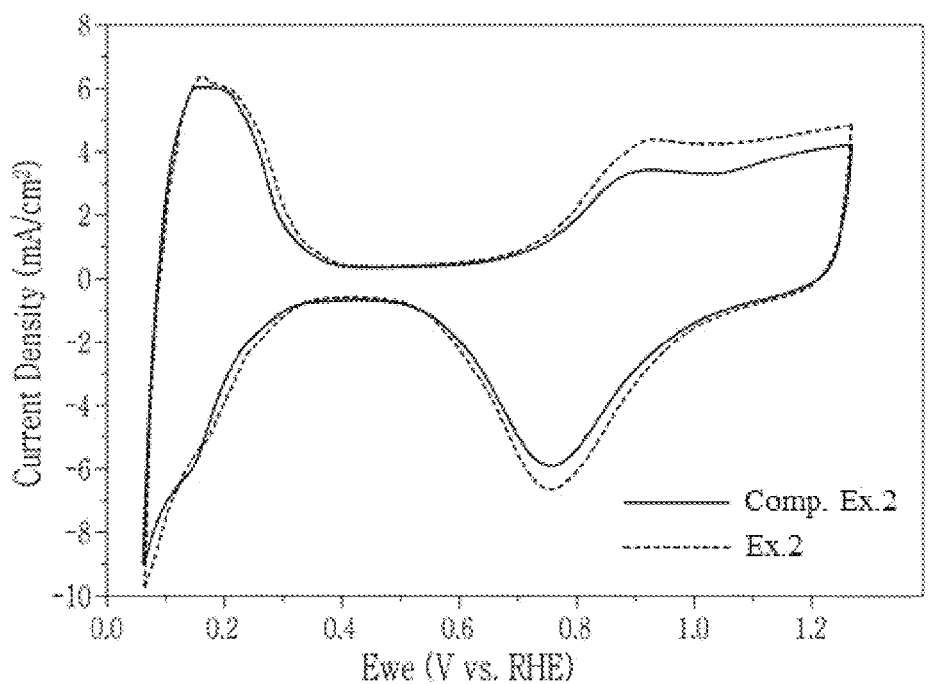
FIG. 20 is a graph showing the results of measurement of the cyclovoltammetry (CV) activity of electrodes each including the catalysts of Example 2 and Comparative Example 2 according to the present invention, respectively.
Figure 21:
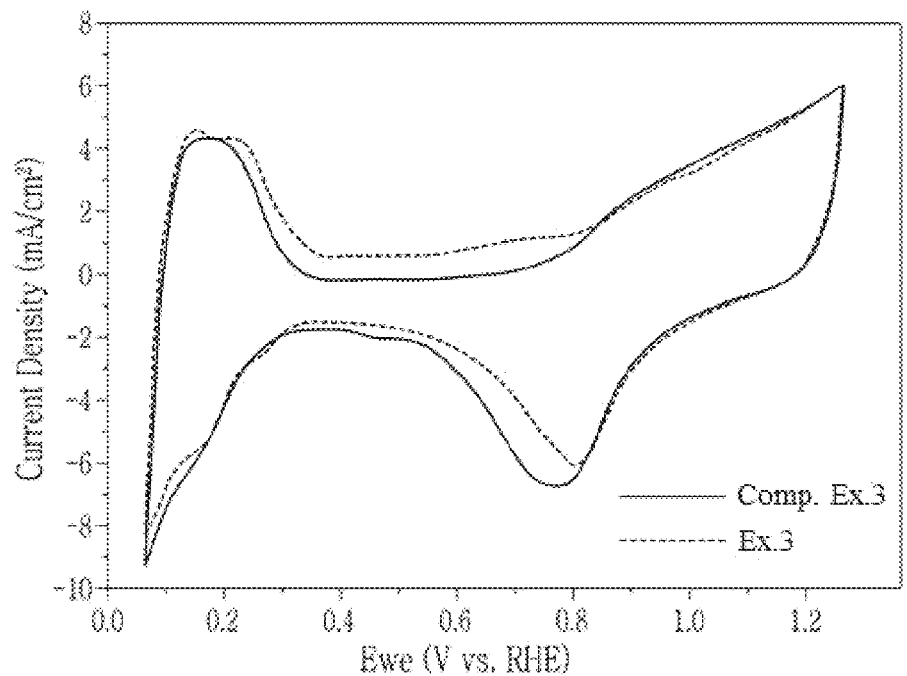
FIG. 21 is a graph showing the results of measurement of the cyclovoltammetry (CV) activity of electrodes each including the catalysts of Example 3 and Comparative Example 3 according to the present invention, respectively.

FIG. 19 is a graph showing the results of measurement of the cyclovoltammetry (CV) activity of the electrodes respectively including the catalysts of Example 1 and Comparative Example 1, FIG. 20 is a graph showing the results of measurement of the cyclovoltammetry (CV) activity of the electrodes respectively including the catalysts of Example 2 and Comparative Example 2, and FIG. 21 is a graph showing the results of measurement of the cyclovoltammetry (CV) activity of electrodes respectively including the catalysts of Example 3 and Comparative Example 3.

As can be seen from FIGS. 19 to 21, all of Examples 1 to 3 exhibited an increase in the electrochemically active area (ECSA). The hydrogen desorption curves of Examples 1 and 2 were larger than those of Comparative Examples 1 and 2, and exhibited increases of 12% and 11% in the electrochemically active area (ECSA), respectively. This evidences that the fluorine groups formed on the surface of the catalyst enhances the bonding between the ionomer and the catalyst. In the case of Example 3, although the performance was expected to decrease due to the increased size of the metal particles as shown in the TEM and XRD results, Example 3 also exhibited an increase in the electrochemical active area (ECSA) compared to Comparative Example 3. The capacitance increase due to the generation of additional pores during the heat treatment is considered to be a cause of the ECSA increase.

Figure 22:
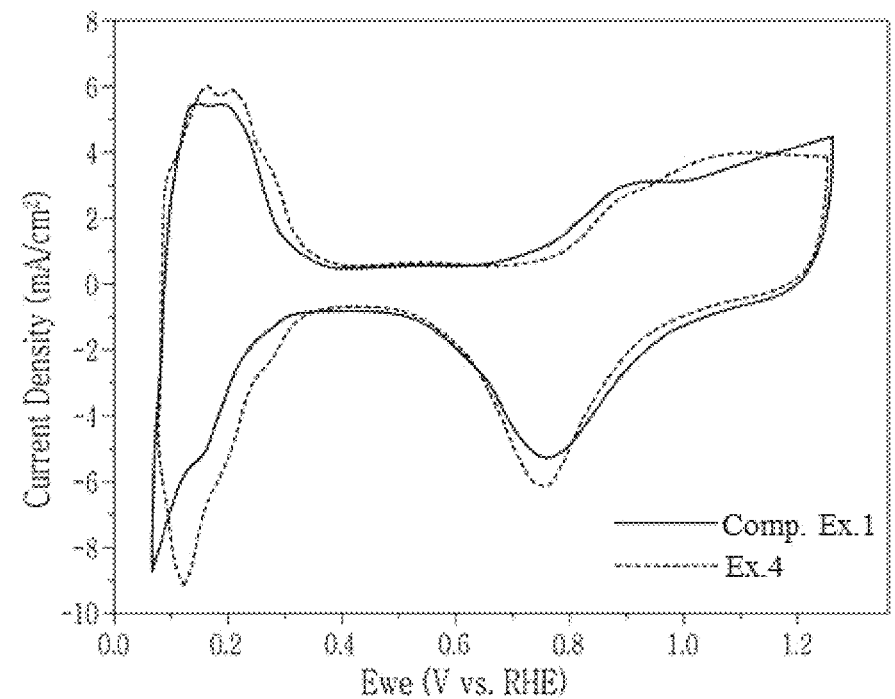
FIG. 22 is a graph showing the results of measurement of the cyclovoltammetry (CV) activity of electrodes each including the catalysts of Example 4 and Comparative Example 1 according to the present invention, respectively.

FIG. 22 is a graph showing the results of measurement of the cyclovoltammetry (CV) activity of electrodes respectively including the catalysts of Example 4 and Comparative Example 1. As can be seen from FIG. 22, the electrochemically active area (ECSA) of Example 4 where the fluorination was carried out with the organic compound precursor was also increased, compared to Comparative Example 1. As mentioned above, this evidences that the fluorine groups formed on the surface of the catalyst enhances the bonding between the ionomer and the catalyst. The change in the position of the hydrogen adsorption curve is considered to have been caused due to the influence of the fluorine-containing resin layer, but further identification of the cause is required.

Figure 23:
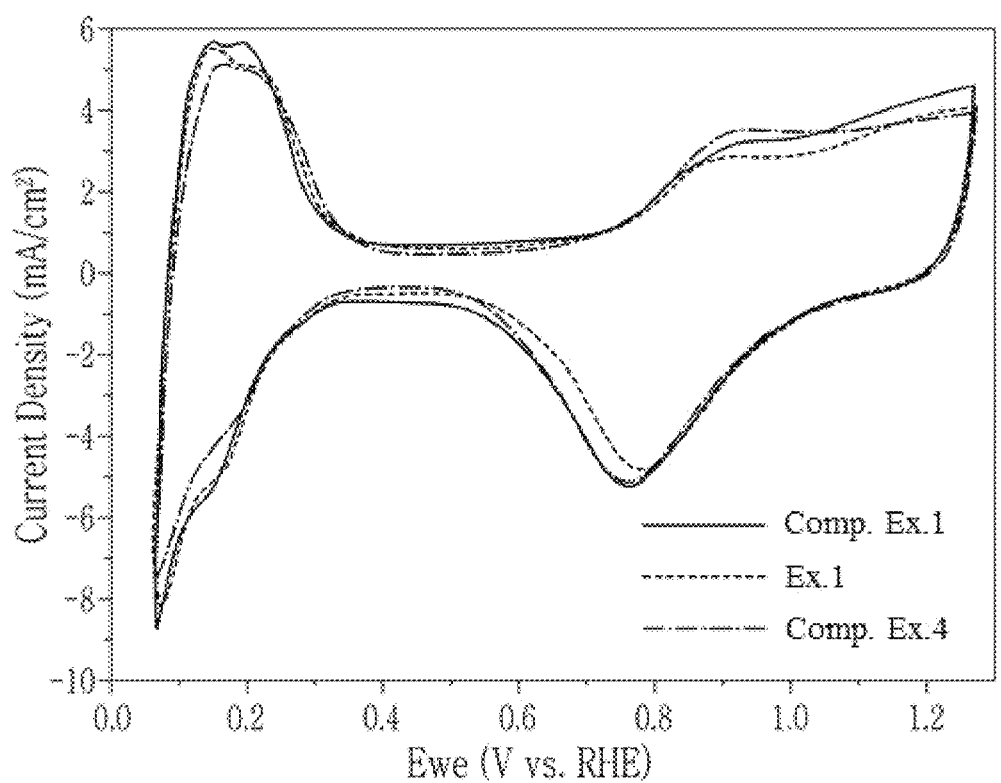
FIG. 23 is a graph showing the results of measurement of the cyclovoltammetry (CV) activity of electrodes each including the catalyst of Example 1, the catalyst of Comparative Example 1 and the catalyst of Comparative Example 4.

FIG. 23 is a graph showing the results of measurement of the cyclovoltammetry (CV) activity of electrodes respectively including the catalysts of Example 1, Comparative Example 1, and Comparative Example 4. As can be seen from FIG. 23, the catalyst of Comparative Example 4 prepared using a surface-fluorinated support exhibited catalytic activity even lower than that of the catalyst of Comparative Example 1, i.e., a conventional commercial catalyst.

The invention claimed is:

1. A catalyst comprising:
    a support;
    a metal particle supported on the support; and
    fluorine (F) groups formed on a surface of the support and a surface of the metal particle, respectively,
        wherein the support is at least one selected from the group consisting of carbon black, porous carbon, carbon fiber, carbon nanotube (CNT), carbon nanohorn, and graphene.

2. The catalyst according to claim 1, wherein the metal particle comprises at least one selected from the group consisting of platinum (Pt), palladium (Pd), ruthenium (Ru), iridium (Ir), osmium (Os), and a platinum-Me alloy,
    wherein Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y) and rhodium (Rh).

3. A method for manufacturing a catalyst, the method comprising:
    preparing a support having a metal particle supported thereon;
    mixing a precursor, which is an organic fluorine compound monomer or an inorganic fluorine compound, with the support having the metal particle supported thereon to obtain a mixture, wherein the precursor is coated on each of a surface of the metal particle and a surface of the support by the mixing; and
    heat-treating the mixture at a temperature of 100 to 300° C., wherein fluorine (F) groups are formed on the surface of the metal particle and the surface of the support, respectively, by the heat treatment,
    wherein the mixing is performed using at least one selected from the group consisting of a homogenizer, a high-pressure disperser, a ball mill, a powder mixer, and a resonance acoustic mixer.

4. The method according to claim 3, wherein, in the mixing step, a weight ratio of the precursor to the support having the metal particle supported thereon is 1:2 to 1:50.

5. The method according to claim 3, wherein the organic fluorine compound monomer comprises R—F$_x$,
    wherein R is an alkyl group, an aryl group, a benzyl group, a vinyl group, or an acyl group, and x is an integer of 1 to 6.

6. A method for manufacturing a catalyst, the method comprising:
    preparing a support having a metal particle supported thereon;
    mixing a precursor, which is an inorganic fluorine compound, with the support having the metal particle supported thereon to obtain a mixture, wherein the precursor is coated on each of a surface of the metal particle and a surface of the support by the mixing; and
    heat-treating the mixture at a temperature of 100 to 300° C., wherein fluorine (F) groups are formed on the surface of the metal particle and the surface of the support, respectively, by the heat treatment, wherein the inorganic fluorine compound comprises $M\text{-}F_x$, wherein M is any one selected from the group consisting of H, $NH_4$, Ca, Si, P, B, and Al, or a compound of two or more thereof, and x is an integer of 1 to 6.

7. A method for manufacturing a catalyst, the method comprising:

preparing a support having a metal particle supported thereon;

mixing a precursor, which is an organic fluorine compound monomer or an inorganic fluorine compound, with the support having the metal particle supported thereon to obtain a mixture, wherein the precursor is coated on each of a surface of the metal particle and a surface of the support by the mixing; and heat-treating the mixture at a temperature of 100 to 300° C., wherein fluorine (F) groups are formed on the surface of the metal particle and the surface of the support, respectively, by the heat treatment, wherein the heat treatment is performed for 2 to 4 hours in an inert gas atmosphere.

8. An electrode comprising:

a catalyst; and an ionomer, wherein the catalyst comprises:

a support;

a metal particle supported on the support; and fluorine (F) groups formed on a surface of the support and a surface of the metal particle, respectively.

9. A membrane-electrode assembly comprising:

an anode;

a cathode; and an ion exchange membrane interposed between the anode and the cathode, wherein at least one of the anode and the cathode is the electrode according to claim 8.

10. A fuel cell comprising the membrane-electrode assembly according to claim 9.

* * * * *